United States Patent
Andersen

(10) Patent No.: US 8,899,920 B2
(45) Date of Patent: Dec. 2, 2014

(54) WIND TURBINE YAW SYSTEM AND METHOD OF CONTROLLING THE SAME

(75) Inventor: Kurt Andersen, Vorbasse (DK)

(73) Assignee: Siemens Aktiengesellschaft, Munich (DE)

( * ) Notice: Subject to any disclaimer, the term of this patent is extended or adjusted under 35 U.S.C. 154(b) by 683 days.

(21) Appl. No.: 13/166,000

(22) Filed: Jun. 22, 2011

(65) Prior Publication Data

US 2011/0318178 A1 Dec. 29, 2011

(30) Foreign Application Priority Data

Jun. 29, 2010 (EP) .................................... 10167623

(51) Int. Cl.
*F03D 7/04* (2006.01)
*F03D 7/02* (2006.01)

(52) U.S. Cl.
CPC ............ *F03D 7/0204* (2013.01); *F05B 2240/40* (2013.01); *F05B 2270/1032* (2013.01); *F05B 2260/74* (2013.01); *Y02E 10/723* (2013.01)
USPC .......... 416/1; 416/9; 416/30; 416/43; 416/61; 416/170 R; 415/1; 415/4.3; 415/4.5; 415/20; 415/118; 290/44; 290/55

(58) Field of Classification Search
CPC ......... F03D 1/00; F03D 7/0204; F03D 7/042; F03D 11/0091; F05B 2260/74; F05B 2270/20; F05B 2270/329; F05B 2270/821
USPC ......... 416/1, 9, 30, 43, 61, 170 R; 415/1, 4.3, 415/4.5, 16, 20, 124.1, 118, 908; 290/44, 290/55
See application file for complete search history.

(56) References Cited

U.S. PATENT DOCUMENTS

| | | | |
|---|---|---|---|
| 4,147,035 A | | 4/1979 | Paluka |
| 4,515,525 A | * | 5/1985 | Doman ........................... 416/11 |
| 4,966,525 A | * | 10/1990 | Nielsen .............................. 416/9 |
| 5,035,575 A | * | 7/1991 | Nielsen et al. ...................... 416/9 |
| 5,278,773 A | * | 1/1994 | Cousineau ....................... 416/36 |
| 5,422,826 A | * | 6/1995 | Cousineau ....................... 416/36 |
| 5,990,568 A | * | 11/1999 | Hildingsson et al. ............ 290/55 |
| 6,176,675 B1 | * | 1/2001 | Engstrom ...................... 415/4.3 |
| 7,288,851 B2 | | 10/2007 | Wobben |
| 7,436,083 B2 | * | 10/2008 | Shibata et al. .................. 416/11 |
| 7,458,776 B2 | * | 12/2008 | LLorente Gonzalez et al. . 416/9 |
| 2003/0160456 A1 | | 8/2003 | Wobben |
| 2009/0091278 A1 | | 4/2009 | Sheiretov |
| 2009/0232652 A1 | | 9/2009 | Keller et al. |
| 2010/0143124 A1 | | 6/2010 | Narasimalu |

FOREIGN PATENT DOCUMENTS

| | | |
|---|---|---|
| CN | 101404476 A | 4/2009 |
| EP | 2 189 656 A2 | 5/2010 |
| WO | WO 2008/053017 A2 | 5/2008 |
| WO | WO 2008053017 A2 | 5/2008 |

* cited by examiner

*Primary Examiner* — Igor Kershteyn

(57) ABSTRACT

A wind turbine yaw system is provided that includes a yaw gear, at least two pinion gears, and at least two drive units, each of which is associated to one of the pinion gears for driving that pinion gear. The yaw system also includes a control system with a controller for generating a drive unit control signal for each drive unit for controlling the respective drive unit according to a reference signal having a desired operational parameter value for the respective drive unit, so as to realize the desired operational parameter value in the respective drive unit. The control system includes a feedback loop for each drive unit feeding a drive unit feedback signal including at least the actual value of one operational parameter of the respective drive unit back to the controller. The controller generates the drive unit control signals based on the reference signal and the feedback signals.

16 Claims, 3 Drawing Sheets

WIND TURBINE YAW SYSTEM AND METHOD OF CONTROLLING THE SAME

CROSS REFERENCE TO RELATED APPLICATIONS

This application claims priority of European Patent Office application No. 10167623.7 EP filed Jun. 29, 2010, which is incorporated by reference herein in its entirety.

FIELD OF INVENTION

The present invention relates to a wind turbine yaw system with a yaw gear, at least two pinion gears and at least two drive units where each drive unit is associated to one of the pinion gears. In addition, the invention relates to a control method for such a wind turbine yaw system.

BACKGROUND OF INVENTION

A wind turbine yaw system is located between the nacelle and the tower of a wind turbine and serves for rotating the rotor of the wind turbine about the tower axis. It typically comprises a gear assembly with a ring gear fixed to the tower and at least one motor driven pinion gear fixed to the nacelle. Usually, at least two motor driven pinion gears are present for realizing a more even load distribution over the ring gear. An example for a wind turbine yaw system is described in WO 2008/053017 A2. When the rotor axis of the wind turbine is not in alignment with the wind direction the yaw system rotates the nacelle such as to bring the rotor axis into alignment with the wind direction by driving the pinion gears which mesh with the ring gear.

As already mentioned, typically at least two drive units and pinion gears meshing with the ring gear are used. However, such a configuration represents mechanically connected motors which can lead to load sharing issues like different loads experienced by the motors not only when motors of different sizes are used but also when motors of the same size are used which have slightly different characteristics. Although at low load the low sharing is usually not an issue, at high or full load the driving motor with lower slip takes a higher share of the load than the motor with a higher slip. This in turn induces unequal tear and wear of the mechanical components of the drive motors and the transmissions.

SUMMARY OF INVENTION

It is therefore an objective of the present invention to provide a wind turbine yaw system which allows for more evenly distributing the loads over drive units in a yaw system. It is a further objective to provide an advantageous wind turbine. It is a still further objective of the present invention to provide a method for controlling the drive units in a yaw system which allows to more evenly distribute the loads over the drive units.

These objectives are solved by the features of the independent claims. The depending claims contain further developments of the invention.

An inventive wind turbine yaw system comprises a yaw gear, at least two pinion gears, at least two drive units where each drive unit is associated to one of the pinion gears for driving the respective pinion gear, and a control system with a controller. The controller is configured for generating for each drive unit a drive unit control signal for controlling the respective drive unit according to a drive unit reference signal comprising at least one desired operational parameter value for the respective drive unit so as to realise the at least one desired operational parameter value in the respective drive unit. The control system further comprises at least one feedback loop for each drive unit which feedback loop feeds at least one drive unit feedback signal comprising at least the actual value of one operational parameter of the respective drive unit back to the controller. The controller is adapted to generate the drive unit control signals based on the reference signal and the feedback signals.

Using the feedback loops allows to control the drive units so as to minimize the difference between the loads experienced by the individual drive units. By this measure, the mechanical tear and wear may be equally shared between the mechanical and/or electrical components of the drive units which, in turn, ensures a prolonged component lifetime and a prolonged service interval.

In particular, each drive unit may comprise at least one torque sensor sensing a torque the respective drive unit yields. The torque sensor may either be a mechanical or an electromagnetically torque sensor. In this case, each feedback signal may represent at least the output of the respective torque sensor.

Preferably, each drive unit comprises an electric motor. Then each feedback signal may, in particular, represent at least one operational parameter of the respective electric motor. For example the load experienced by an electric motor may be used as operational parameter in the feedback signal. Moreover, as the load experienced by an electric motor can be represented by the current consumed by the respective motor this current is indicative of the load experience by the motor, and can, therefore, be used an operational parameter representing the load experienced by the motor in the feedback signal.

In addition, each drive unit may comprise a gear between the electric motor and the pinion gear. In this case, each feedback signal may represent at least one operational parameter of the gear. For example, a torque sensor like the already mentioned torque sensor may be located at the high speed side of the gear and/or at the low speed side of the gear. Then, the operational parameter of the gear would be the torque experienced by the gear or yielded by the gear, respectively. As a further alternative, a torque sensor could be located in the gear itself.

Still further, each drive unit may comprise a position encoder encoding the rotational position of a shaft connecting the motor and the pinion gear or, if a gear is present between the motor and the pinion gear, the motor and the gear or the gear and the pinion gear. As a further alternative, the position encoder could be located at a gear wheel of the gear. If such a position encoder is present, the feedback signal may represent at least the output of the respective position encoder which can represent, if suitably calibrated, the load acting on the pinion gear.

Still further, each drive unit may comprise a frequency converter between the controller and the motor for controlling the speed of the motor. In this case, each feedback signal may represent at least one operational parameter of the respective frequency converter.

An inventive wind turbine comprises an inventive wind turbine yaw system. In such a wind turbine the lifetime of the yaw system can be prolonged as can the service intervals through the use of the inventive yaw system.

According to a further aspect of the invention, a method of controlling a wind turbine yaw system with a yaw gear, at least two pinion gears and at least two drive units, where each drive unit is associated to one of the pinion gears for driving the respective pinion gear is provided. In the inventive method, each drive unit is controlled according to a drive unit reference signal comprising at least one desired operational parameter value for the respective drive unit so as to realise the at least one desired operational parameter value in the respective drive unit. At least the actual value of one operational parameter of each drive unit is fed back to the controller by means of a feedback signal. The controller generates the drive unit control signals for the drive units based on the reference signal and the respective feedback signals.

Using the feedback signals from the drive units allows for controlling the drive units such as to minimize load differences between the individual drive units. By this measure differences in tear and wear of the individual drive units can be reduced which in turn allows for prolonging the lifetime of the yaw system and for prolonging the service intervals.

In particular, the drive unit control signals may be generated based on the reference signal and differences between the operational parameter values contained in the respective feedback signals. However, it is also possible to generate each drive unit control signal based on the difference between the at least one operational parameter value of the reference signal and the at least one operational parameter value of the feedback signal of the drive unit to be controlled by the respective drive unit control signal.

If each drive unit comprises an electric motor the feedback signal of a drive unit may represent at least one operational parameter of the respective motor, e.g. the current consumed by the motor which is indicative of the load experienced by the motor.

Further more, if each drive unit comprises a frequency converter for controlling the speed of the electric motor and/or a gear between the electric motor and the pinion gear the feedback signal of a drive unit may represent at least one operational parameter of the respective frequency converter and/or the respective gear. For example, the mentioned operational parameter may be the torque that a shaft connected to the gear yields or experiences, an output output of the frequency converter, the rotational position of the gear, etc.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
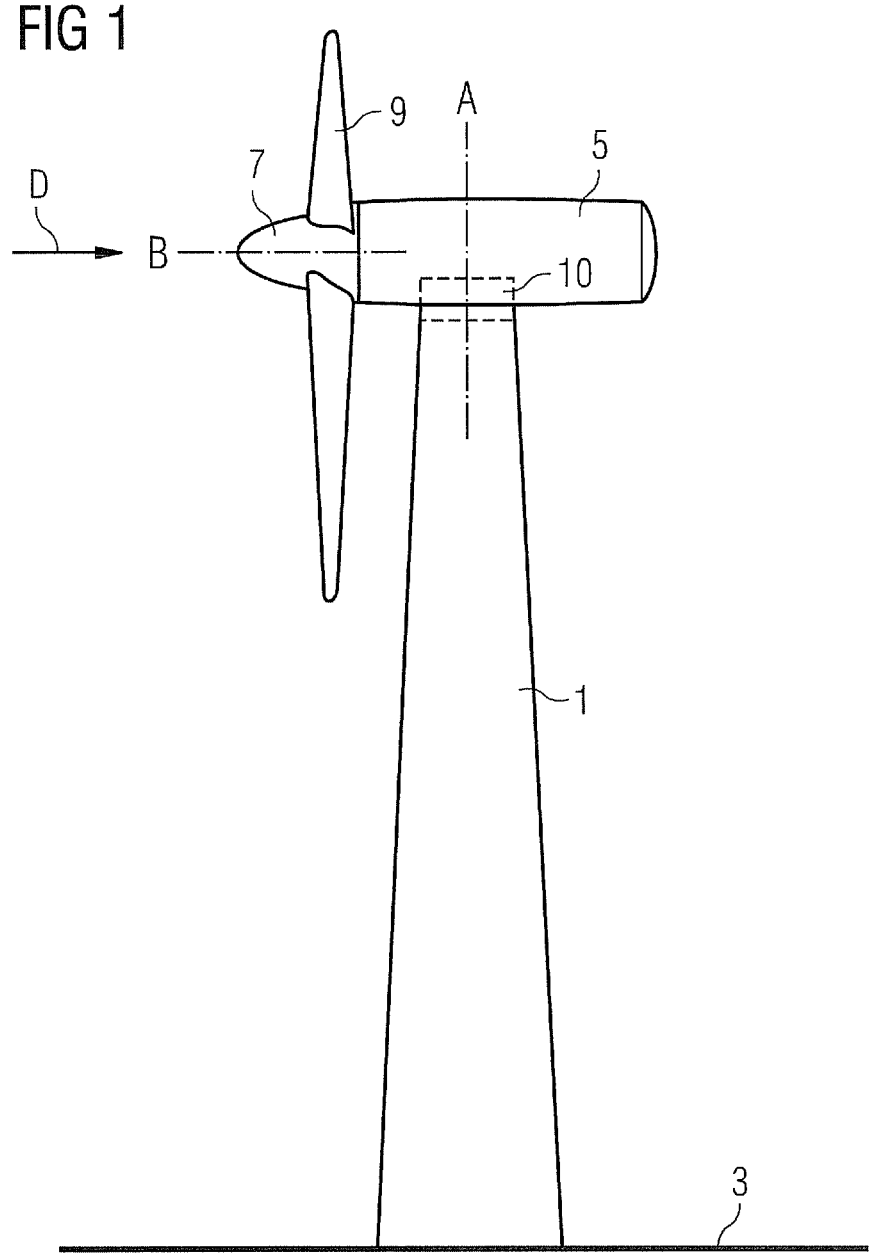
FIG. 1 schematically shows a wind turbine.

A typically wind turbine is shown in FIG. 1. The wind turbine 1 comprises a tower 1 which rests on a fundament in the ground 3. At the top of the tower 1, a nacelle 5 is located which carries a rotor 7 driven by the wind. Typically the rotor comprises three rotor blades 9 arranged in angles of 120°. Other rotor designs with more or less than three rotor blades are possible, for example two bladed rotors or even one bladed rotors. However, two bladed rotors and, in particular, three bladed rotors are most commonly used.

Figure 2:
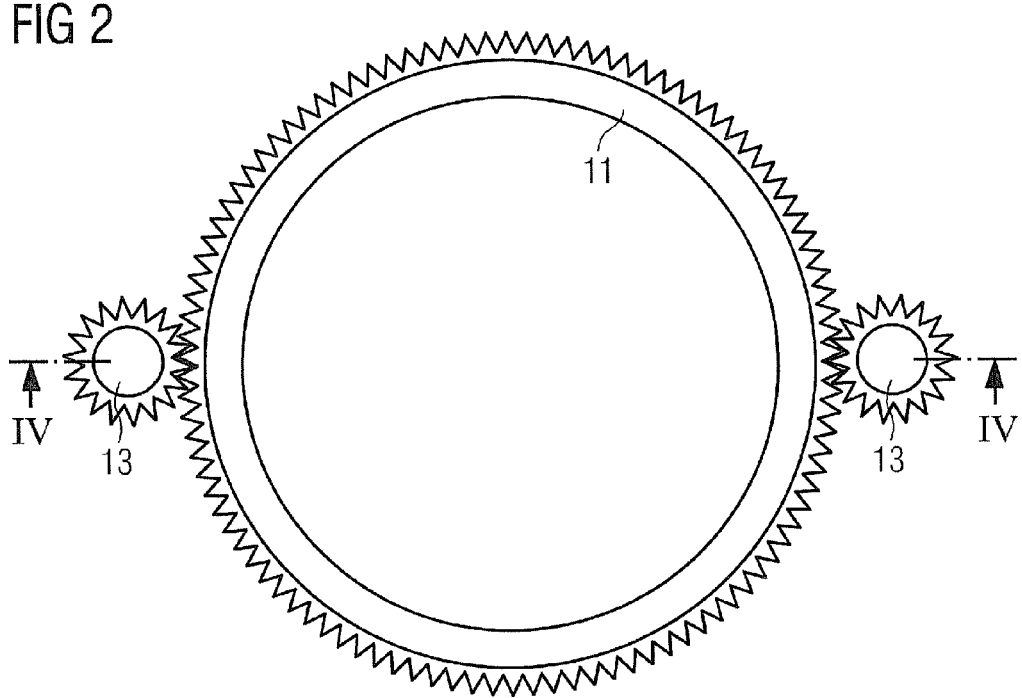
FIG. 2 schematically shows the ring gear and a other pinion gears of the yaw system of the wind turbine shown in FIG. 1.

A yaw drive 10 is arranged between the nacelle 5 and the tower 1 for allowing the nacelle 5 to be rotated about a tower axis A so as to bring the rotor axis B into alignment with the wind direction D and keep the rotor axis B aligned with the wind direction D. A typical yaw drive 10 is schematically shown in FIG. 2 in a plan view. It comprises a ring gear 11 which is typically located at the tower top and a number of pinion gears 13 located at the nacelle 5 which mesh with the ring gear 11. The pinion gears 13 can be driven by electric motors so that by rotating the pinion gear 13 a rotation of the nacelle 5 about the tower axis A can be effected. Note that although the ring gear is typically located at tower 1 and the pinion gears 13 are typically located at the nacelle 5 it would also be possible to locate the pinion gears 13 at the tower 1 and the ring gear 11 at the nacelle 5.

A schematic plan view of a gear assembly used in a wind turbine yaw drive is shown in FIG. 2. The Figure shows the ring gear 11 and two pinion gears 13. Note that it is not mandatory to use two pinion gears 13. In fact, the number of pinion gears 13 can be more than two, for example three or four or even more pinion gears. A higher number of pinion gears leads to a more even load distribution at the ring gear.

As already mentioned, the pinion gears 13 are typically driven by electric motors, i.e. induction motors, which typically consist of two basic electric assemblies, namely a wound stator and a rotor assembly. When supplying an AC current, in particular a two or three phase current, to the windings of the stator this produces a rotating magnetic field acting on the rotor. The rotor turns due to the rotating magnetic field which induces a current in the conductors of the rotor.

When no load is applied to the rotor the rotor rotates with the same rotational frequency as the magnetic field, i.e. the rotor rotates with the so called synchronous speed of the motor. This synchronous speed is determined by the number of poles in the stator and the frequency of the power supply according to the formula:

$$Ns = \frac{120 \cdot f}{P},$$

where
Ns is the synchronous speed
f is the frequency of the power supply and
P is the number of poles.

The synchronous speed, i.e. the speed where there is no difference between the rotor speed and the speed of the rotating magnetic field, is the upper limit of the possible motor speed. When the motor rotates with the synchronous speed no voltage is induced in the rotor and, as a consequence, no torque is developed therefore. On the other hand, when a load is applied to the rotor the motor speed slows down so that a difference develops between the speed of the magnetic field and the rotor speed. This difference between the rotor speed and the speed of the magnetic field is called the slip and is calculated as $$s = \frac{100 \cdot (Ns - Na)}{Ns},$$

where
s is the slip
Ns is the synchronous speed
Na is the actual speed of the motor.

When a slip occurs, a voltage is induced in the rotor and, hence, torque is developed.

Figure 3:
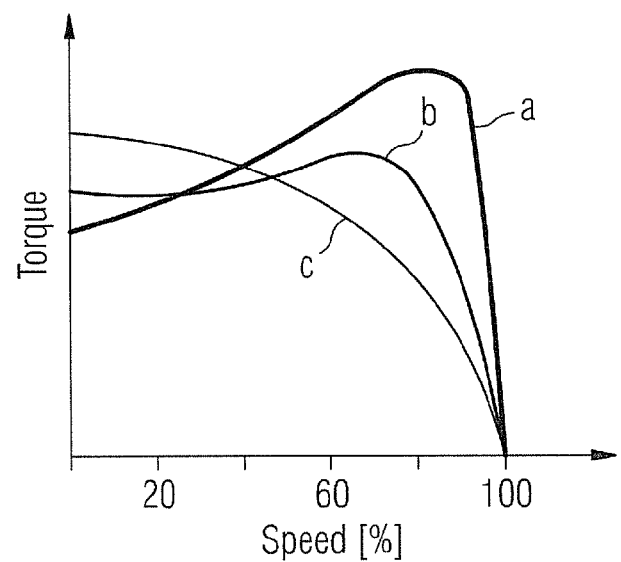
FIG. 3 shows typical motor characteristics of electric motors.

Depending on the design of the induction motor the relation between the actual speed and the generated torque takes various characteristics as it is schematically illustrated in FIG. 3. The Figure shows the torque developed by three different kinds of motors A, B and C as a function of the motor speed. The motors A and B, which may be regarded as so called "low-slip" motors show a constant or increasing torque over a wide range of rotor speeds. On the other hand, so called "high-slip" motors show a decreasing torque with increasing motor speed over the whole range or at least a substantial part of the speed range.

If the motors used to drive the pinion gears have even slightly different characteristics, e.g. due to tolerances in the production process, load sharing issues may arise.

The speed of an induction motor is often controlled by controlling the frequency of the current supplied to the motor by use of a frequency controller. Furthermore, a gear may be present between the electric motor and the pinion gear in order to scale down the revolutions of the motor to a desired lower level.

The inventive wind turbine yaw system comprises a control system for controlling the torque developed by the drive unit which, in the present embodiment, each comprise an electric motor as described above, a frequency controller for controlling the motor speed by supplying a current with a suitable frequency to the motor and a gear for scaling down the rotational speed of the motor to a lower rotational speed of the pinion gear.

Figure 4:
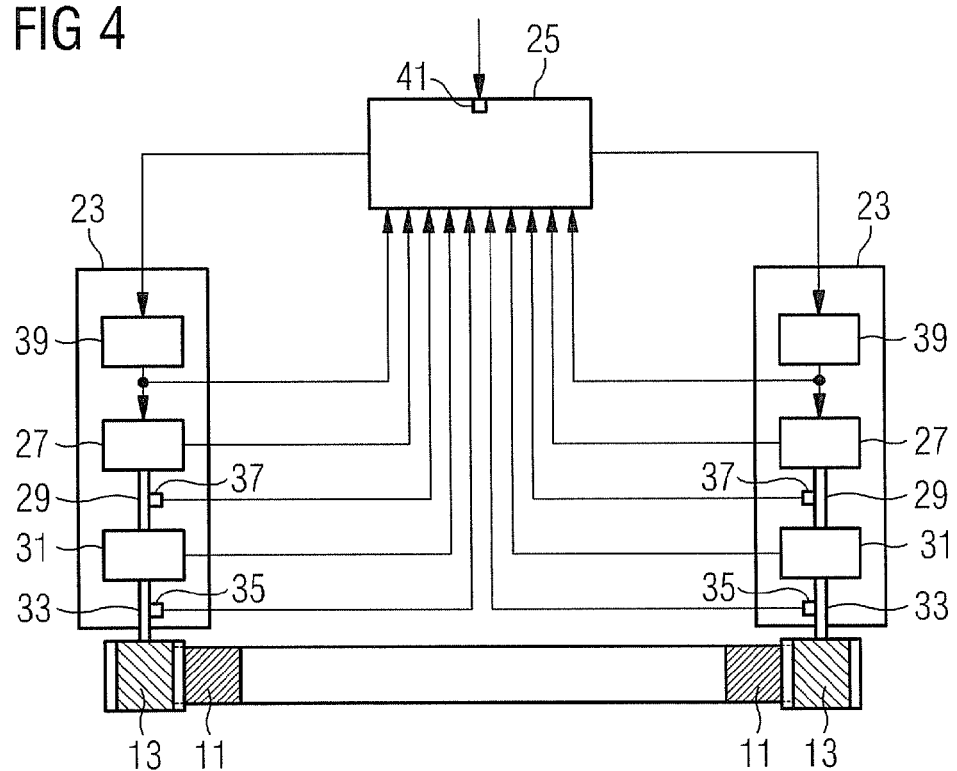
FIG. 4 schematically shows a control system of the wind turbine yaw system.

A schematical illustration of the yaw system with the control system is shown in FIG. 4. This Figure represents a sectional view along the line IV-IV in FIG. 2 and shows the ring gear 11 and the two pinions gears 13 as well as two drive units 23. Each drive unit 23 drives one of the pinion gears 13 and is controlled by a common controller 25.

Each drive unit 23 comprises an electric motor 27 for generating the driving torque of the drive unit. The electric motor 27 is coupled via a first shaft 29 to the high speed side of a gear 31 for scaling down the rotational speed of the rotor. The low speed site of the gear 31 is connected via a second shaft 33 to the pinion gear 13. Furthermore, each drive unit 23 comprises a position encoder 35 which is, in the present embodiment, located at the second shaft 33 of the drive unit 23, i.e. at the low speed side of the gear 33. However, the position encoder 35 may as well be located at the first shaft 29, i.e. at the high speed side of the gear 31, or at a gear wheel of the gear 31. The position encoder may work on an electrical, a magnetical or an optical basis. In addition, each drive unit 23 comprises a torque sensor 37 which is, in the present embodiment, located at the first shaft 29 of the drive unit 23, i.e. at the high speed side of the gear 31. Like the position encoder 35 the torque sensor may be located in alternative positions, e.g. at the second shaft 33, i.e. at the low speed side of the gear 31, or in the gear 31 itself. The torque sensor 37 may either be a mechanical torque sensor or a magnetic torque sensor.

Each drive unit 23 is controlled by the controller 25 through controlling the rotational speed of the rotor by means of a frequency converter 39 receiving control signals from the controller 25. The control signals allow for providing the electric motor 27 with a alternating current having a specific frequency so as to achieve a desired rotational speed of the pinion gear 13. The control signal for acting on the frequency converter 39 is determined by the controller 25 on the basis of a reference signal input through a reference signal input 41. The reference signal comprises a desired rotational speed value for the motors 27 and/or a desired torque value for the motors or pinion gears 13. In addition to being based on the reference signal the control signal output by the controller 25 to the frequency converters 39 of the drive units 23 is also based on feedback signals derived from the drive units 23 which represent the actual value of at least one operational parameter of the respective drive unit 23.

For example, a control signal generated by the controller 25 and output to a frequency converter 39 may be derived by the difference of an operational parameter value contained in the feedback signal of the respective drive unit 23 from the desired operational parameter value which is contained in the reference signal. By this measure, it can be assured that a desired operational parameter value of each motor 27 and/or pinion gear 13 can be reached and kept. For example, it becomes possible to keep the torque developed by each pinion gear 13 constant at the torque level which is desired for the respective pinion gear 13.

Alternatively, it would be possible to form the difference between the operational parameter values contained in the feedback signals derived from the different drive units 23. Then, the control signals delivered to the frequency converters 39 would be chosen such that the difference in the operational parameter values contained in the feedback signals of the two drive units 23 would be reduced preferably to zero. If the operational parameter would, for example, be the torque by which the pinion gears 13 act on the ring gear 11, reducing the difference between the torques provided by the two pinion gears to zero would mean that each pinion gear 13 is acting with a same torque on the ring gear 11.

Note that although the torque was exemplary mentioned as the operational parameter contained in the feedback signal, which is an indication of the actual load of each pinion gear 13, other operational parameters can be used as operational parameters in the feedback signals, as well.

FIG. 4 shows different kinds of feedback signals which an be used for controlling the yaw drive, in particular for controlling the drive units 23. As already mentioned, each drive unit 23 comprises a position encoder 35 which may either be implemented on the high speed side or the low speed side of the gear, or a gear itself. After an initial calibration the position encoder can determine the exact angular position of the respective shaft or gear wheel which in turn is an indication of the level of fixation of the pinion gear 13 to the gear ring 11 and, thereby, an indicator of the load acting between the pinion gear and the gear ring 11.

Furthermore, the torque sensor that may either be implemented at the high speed side of the gear, the low speed side of the gear, or at the gear itself, also provides a measure of the load acting between the respective pinion gear 13 and the gear ring 11.

Furthermore, an operational parameter of the drive unit which can be used as an indication of the actual load acting between the respective pinion gear and the gear ring 11 is the current consumed by the motor 27. Hence, the current consumed by a motor is also a suitable parameter for the feedback signal.

A still further suitable operational parameter would be the rotational frequency of the rotor in the motor 27.

To summarize, a suitable feedback signal can contain either of an operational parameter derived from the gear 31 or one of the shafts 29, 33, an operational parameter derived from the electric motor 27 and an operational parameter derived from the frequency converter 39. Moreover, it is possible not only to use one feedback signal but to use a number of feedback signal containing values of different operational parameters. Additionally or alternatively, a number of values of operational parameters can also be combined in one feedback signal.

By the present invention which has been described in conjunction with exemplary embodiments thereof, load sharing of the drive units of the yaw system can be assured. This is achieved by using a close loop control system which does not only rely on a reference signal but also on at least one feedback signal from each of the drive units. With such a control system it becomes possible to assure that the mechanical work needed to perform a requested yaw task is distributed equally to each of the drive units on a substantially equal load basis. This offers the advantage that the mechanical tear and wear is equally shared between the mechanical and/or electrical components of the drive units.

The invention claimed is:

1. A wind turbine yaw system, comprising:
a yaw gear,
at least two pinion gears;
at least two drive units, wherein each drive unit is associated to one of the at least two pinion gears for driving the respective pinion gear; and
a control system, comprising
a controller for generating a drive unit control signal for each drive unit for controlling the respective drive unit according to a drive unit reference signal, the drive unit reference signal comprising at least one desired operational parameter value for the respective drive unit so as to realize the at least one desired operational parameter value in the respective drive unit;
at least one feedback loop for each drive unit feeding at least one drive unit feedback signal comprising at least an actual value of the at least one desired operational parameter of the respective drive unit back to the controller,
each drive unit comprises a frequency converter between the controller and the motor for controlling the speed of the motor, and
each feedback signal represents at least an actual value of the at least one desired operational parameter of the respective frequency converter,
wherein the controller is adapted to generate the drive unit control signals based on the reference signal and the feedback signals,
wherein the drive unit control signals delivered to the frequency converters are chosen such that the difference in the at least an actual value of at least one desired operational parameter values contained in the feedback signals of the two drive units are reduced preferably to zero.

2. The wind turbine yaw system as claimed in claim 1, wherein
each drive unit comprises at least one torque sensor sensing a torque the respective drive unit yields, and
each feedback signal represents at least the output of the respective torque sensor.

3. The wind turbine yaw system as claimed in claim 1, wherein
each drive unit comprises an electric motor, and
each feedback signal represents at least one operational parameter of the respective electric motor.

4. The wind turbine yaw system as claimed in claim 3, wherein each feedback signal represents at least the load experienced by the respective electric motor as an operational parameter of the electric motor.

5. The wind turbine yaw system as claimed in claim 3, wherein each feedback signal represents at least the current consumed by the respective electric motor.

6. The wind turbine yaw system as claimed in claim 3, wherein
each drive unit comprises a gear between the electric motor and the pinion gear, and
each feedback signal represents at least one operational parameter of the gear.

7. The wind turbine yaw system as claimed in claim 2, wherein the torque sensor is located at the high speed side of the gear.

8. The wind turbine yaw system as claimed in claim 2, wherein the torque sensor is located at the low speed side of the gear.

9. The wind turbine yaw system as claimed in claim 3, wherein
each drive unit comprises a position encoder encoding the rotational position of a shaft connecting the motor and the pinion gear or, if a gear is present between the motor and the pinion gear, a shaft between the motor and the gear, a shaft between the gear and the pinion gear or of a gear wheel in the gear, and
the feedback signal represents at least the output of the respective position encoder.

10. A wind turbine, comprising:
a tower;
a nacelle located atop the tower which carries a rotor rotatable by wind about a rotor axis; and
a yaw system arranged between the nacelle and the tower for allowing the nacelle to be rotated about a tower axis so as to align the rotor axis with a direction of the wind, the yaw system comprising:
a yaw gear,
at least two pinion gears;
at least two drive units, wherein each drive unit is associated to one of the at least two pinion gears for driving the respective pinion gear; and
a control system, comprising
a controller for generating a drive unit control signal for each drive unit for controlling the respective drive unit according to a drive unit reference signal, the drive unit reference signal comprising at least one desired operational parameter value for the respective drive unit so as to realize the at least one desired operational parameter value in the respective drive unit;
at least one feedback loop for each drive unit feeding at least one drive unit feedback signal comprising at least an actual value of the at least one desired operational parameter of the respective drive unit back to the controller,
each drive unit comprises a frequency converter between the controller and the motor for controlling the speed of the motor, and
each feedback signal represents at least an actual value of the at least one desired operational parameter of the respective frequency converter,
wherein the controller is adapted to generate the drive unit control signals based on the reference signal and the feedback signals,
wherein the drive unit control signals delivered to the frequency converters are chosen such that the difference in the at least an actual value of at least one desired operational parameter values contained in the feedback signals of the two drive units are reduced preferably to zero.

11. A method of controlling a wind turbine yaw system with a yaw gear, at least two pinion gears, at least two drive units, wherein each drive unit is associated to one of the pinion gears for driving the respective pinion gear, the method comprising:
controlling each drive unit according to a drive unit reference signal comprising at least one desired operational parameter value for the respective drive unit so as to realize the at least one desired operational parameter value in the respective drive unit;

feeding at least an actual value of the at least one desired operational parameter of each drive unit to a controller by a feedback signal;

providing each drive unit a frequency converter between the controller and the motor for controlling the speed of the motor;

using the controller to generate drive unit control signals for the drive units based on the respective reference signal and the feedback signals; and choosing drive unit control signals and delivering them to the frequency converters such that the difference in the at least an actual value of at least one desired operational parameter values contained in the feedback signals of the two drive units are reduced preferably to zero.

12. The method as claimed in claim 11, wherein the drive unit control signals are generated based on the respective reference signal and differences between the operational parameter values of the respective feedback signals.

13. The method as claimed in claim 11, wherein each drive unit control signal for a drive unit is generated based on the difference between the at least one desired operational parameter value of the reference signal and the at least one operational parameter value of the feedback signal obtained from the drive unit to be controlled by the respective drive control signal.

14. The method as claimed in claim 11, wherein each drive unit comprises an electric motor and the feedback signal of a drive unit represents at least one operational parameter of the respective electric motor.

15. The method as claimed in claim 11, further comprising providing a frequency converter for each drive unit for controlling the speed of the electric motor and/or a gear between the electric motor and the pinion gear, and wherein the feedback signal of a drive unit represents at least one operational parameter of the respective frequency converter and/or the respective gear.

16. The method as claimed in claim 15, further comprising providing a frequency converter for each drive unit for controlling the speed of the electric motor and/or a gear between the electric motor and the pinion gear, and wherein the feedback signal of a drive unit also represents at least one operational parameter of the respective frequency converter and/or the respective gear.

* * * * *